July 14, 1942.    E. P. G. WRIGHT    2,289,745
METERING EQUIPMENT FOR TELECOMMUNICATION EXCHANGE SYSTEMS
Filed March 21, 1939    7 Sheets-Sheet 5

Fig. 4.A

Inventor
E.P.G. Wright
by E.D. Phinney
Attorney

July 14, 1942.  E. P. G. WRIGHT  2,289,745

METERING EQUIPMENT FOR TELECOMMUNICATION EXCHANGE SYSTEMS

Filed March 21, 1939　　　7 Sheets-Sheet 6

Fig. 4.B.

Inventor
E.P.G.Wright
by
Attorney

Fig. 5.

Patented July 14, 1942

2,289,745

UNITED STATES PATENT OFFICE 2,289,745

METERING EQUIPMENT FOR TELECOMMUNICATION EXCHANGE SYSTEMS

Esmond Philip Goodwin Wright, London, England, assignor to International Standard Electric Corporation, New York, N. Y.

Application March 21, 1939, Serial No. 263,140
In Great Britain April 6, 1938

6 Claims. (Cl. 179—7.1)

This invention relates to metering equipment for telecommunication exchange systems in which the fee varies on both a tariff and a time basis.

The object of the invention is to provide circuits for automatically determining in money values the fee to be charged for a connection from records of the tariff applicable to the connection and of the duration of the connection.

The main feature of the invention comprises fee determining equipment for use in telecommunication exchange systems comprising a tariff-recording device adapted to record which of a number of different arbitrarily-selected monetary tariffs is to be charged for a connection, a call duration recording device adapted to record the length of time a connection is maintained, and devices for automatically determining in money values which include a plurality of different currency units the product of the tariff and the call duration and indicating equipment on which said product is indicated in money values.

The invention will be clearly understood from the following description of one embodiment thereof shown in the accompanying drawings in which:

Figs. 2, 2A, 2B and 2C show the fee calculating circuit comprising a sequence switch S, a 50-point time switch T, a shillings indicator 50-point switch SF, a pence indicator 25-point switch PF and an associating switch CF to the banks of which a number of toll trunk circuits are connected;

Fig. 3 shows a portion of an automatic ticketing printer;

Figure 1:
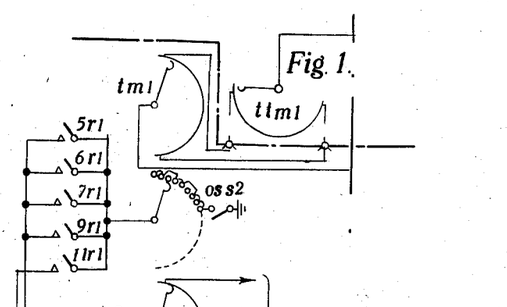
Fig. 1 shows a wiper and bank of a call-duration register switch TT forming part of a toll conversational trunk circuit.
Figure 2:
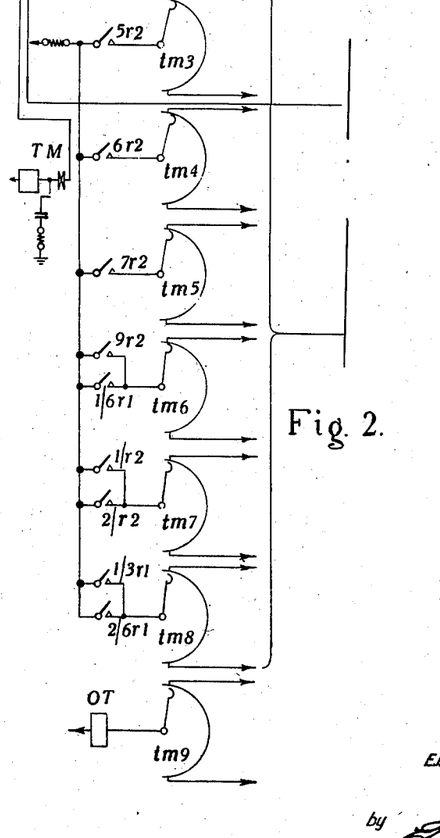

The switch T is stepped out, as will be indicated later, a number of steps corresponding with the conversation time in minutes. The arbitrarily-selected tariffs to be taken into account need have no special arithmetical relation to each other and are 5d, 6d, 7d, 9d, 1/-, 1/3, 1/6, 2/-, 2/6, and relays 5R—2/6R, only contacts of which are shown, are individually operated by tariff determining equipment (not shown) which may be of the kind described in British Patent No. 513,285. The wiper $tm3$ is allocated to a 5d tariff for a 3-minute call, and, for reasons that are explained later, the third contact is connected to a wire corresponding to a charge of 10d, the sixth contact is connected to the wire 1/8, the ninth contact to the wire 2/6, etc. In a similar way, wiper $tm4$ is allocated to the 6d tariff and the contacts are connected as follows:

3 — 1/-
6 — 2/-
9 — 3/-
12 — 4/- etc.

Wiper $tm5$ is allocated to the 7d tariff and is wired as follows:

Contact 3 — 1/2
6 — 2/4
9 — 3/6
12 — 4/8 etc.

Wiper $tm6$ is allocated to both the 9d and 1/6 tariffs, and the contacts are wired:

3 — 1/6
6 — 3/-
9 — 4/6
12 — 6/- etc.

If it is required to charge by the minute on calls longer than 3 minutes, the following contacts will also be wired in the bank of wiper $tm6$.

4 — 2/-
5 — 2/6
7 — 3/6
8 — 4/- etc.

Charging by the minute above three minutes is usually limited to tariffs of over 1/-.

Wiper $tm7$ is allocated to 1/- and 2/- tariffs and will be wired:

3 — 2/-
4 — 2/8
5 — 3/4
6 — 4/- etc.

Wiper $tm8$ is allocated to the 1/3 and 2/6 tariffs and will be wired:

3 — 2/6
4 — 3/4
5 — 4/2
6 — 5/- etc.

Figure 4:
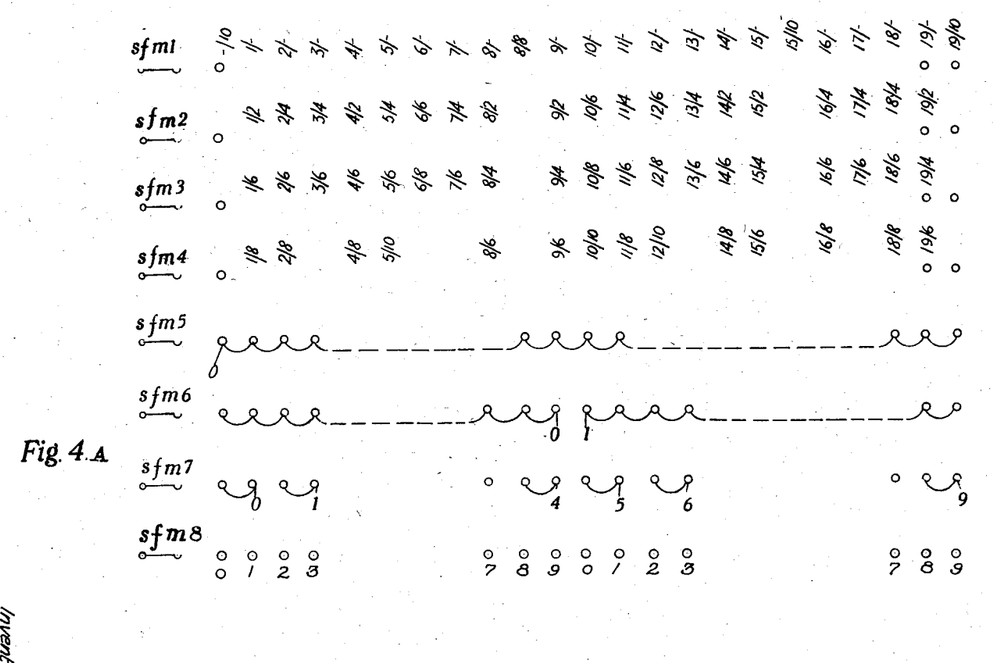
Figs. 4A and 4B show the method of cross-connecting the banks associated with the wipers $sfm1$—$4$ with the banks of the time switch T and of multiplying the banks $sfm5$—$sfm8$ to control printing of the shillings digits for the fees.
Figure 5:
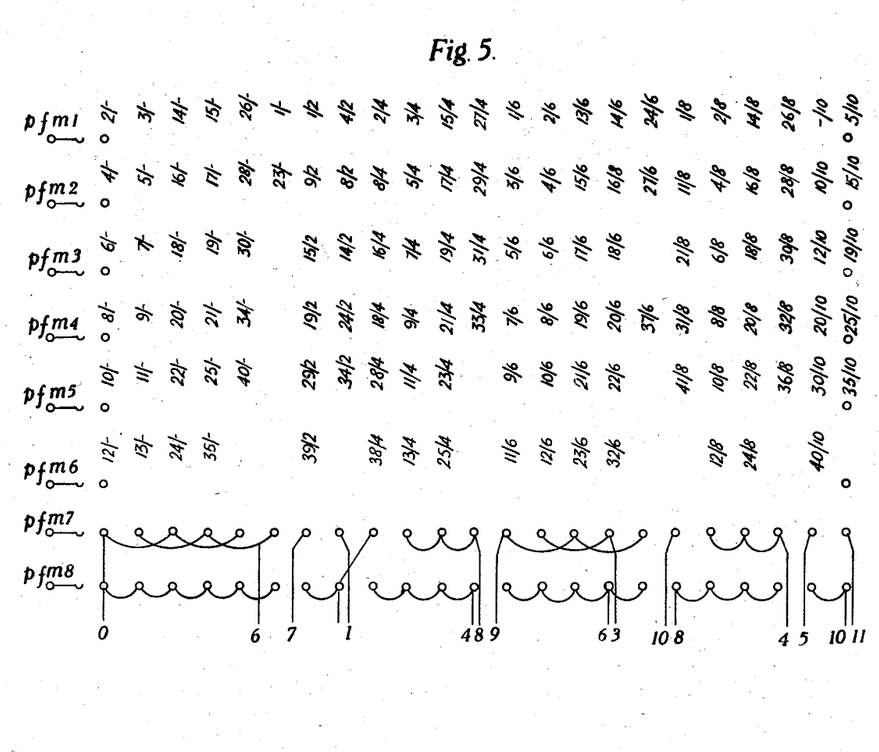
Fig. 5 gives corresponding information for the banks corresponding to the wipers $pfm1$—$8$.

These wires are connected to the SF and PF banks, as shown in Figs. 4A, 4B and 5.

It will be noted that for the smaller tariffs—up to 1/- —the duration wipers are connected to fee wires corresponding to a value double that which should be charged for the call duration in question. This is because certain wipers have been used for two tariffs each, one tariff of each pair being double the other. If the tariff on which the calculation should be made is one of the group of smaller tariffs the charge indicated by the selected wire is automatically halved by the shillings and pence indicator switches.

From the tariffs and the range of call durations to be considered, a list of charges can be compiled, some of which are each the result of a number of different tariff and time combinations. There are 124 different fee wires for calls up to 50 minutes duration, the maximum charge being $$2/6 \times \frac{50}{3} = 41/8$$

there are of course, a large number of fees which are each half of one of said 124 fees.

The fee wires are each connected to an individual contact in any one of four contact levels $sfm1$—$sfm4$ of SF and of six contact levels $pfm1$—$pfm6$ of PF. Thus SF and PF can be set to positions determined by the tariff (selection of one of wipers $tm3$—$tm8$) and by the call duration (position of T) over marking wires, some of which are multiplied on the T banks, between $tm3$—$tm8$ and $sfm1$—$sfm4$ and $pfm1$—$pfm6$.

In SF, the fee wires connected to the four contacts of each position are selected so that the "tens" and "units" shillings digits are the same for all four and of course, for the halves of all four as well. Thus one or more positions of SF are allocated to each shilling value from 0 to 41.

Wiper $sfm5$ is used to transmit signals characteristic of the tens digit of half the shillings corresponding to each switch position to a printer or indicator. The bank contacts of $sfm5$ corresponding to shillings values up to 19 are multiplied together and connected to a marking wire 0; those corresponding to shillings values 20–39 are multipled together and connected to a marking wire 1; while those corresponding to shillings values 40, 41 are connected to a marking wire 2. Similarly the contacts in bank $sfm6$ are multipled and connected to marking wires 1—4 according to the actual tens shillings digits.

Contacts of wiper $sfm7$ are multipled and connected to marking wires corresponding to the units shillings value of half the fees, while contacts of $sfm8$ are multipled and connected to marking wires corresponding to the units shillings value of the whole fee indicated by the position of the switch.

In PF, the fees are grouped so that in each position the fee wires connected to all the contacts correspond to fees all having either odd, or all having even shillings, and also having the same number of pence. This grouping allows of groups of six in the main.

Printer marking wires 1—11 are provided so that whatever the pence value a single printer control only is required. Contacts in level $pfm7$ are multipled and connected to marking wires corresponding to the pence value of half the fees, while contacts in level $pfm8$ are multipled and connected to marking wires corresponding to the pence value of the full tariff.

It will be noted in Fig. 2 that wiper pair $sm5$, $sm6$ and wiper pair $sm7$, $sm8$ of the sequence switch S are each connected together. In positions 9, 10 and 12 of switch S the tens shillings digit, the units shillings digit and the pence digit respectively, are communicated to the printer by earth from front contacts $pn1$. In each of these three positions of S, the marking circuit for the printer has two alternatives one of which is selected by the operated tariff relay 5R—2/6R. If one of relays 5R—1/3R is energised, earth is connected via $sm8$, $sm7$ to $sfm5$, or $sfm7$, or $pfm7$ respectively, for the digits of half the fee corresponding to the positions of SF, PF; if one of the relays 1/6R, 2/-R, 2/6R is energised, earth is connected via $sm6$, $sm5$, to $sfm6$, or $sfm8$, or $pfm8$, for the digits of the complete fee corresponding to the position of switches SF, PF.

Figures 2, 3:
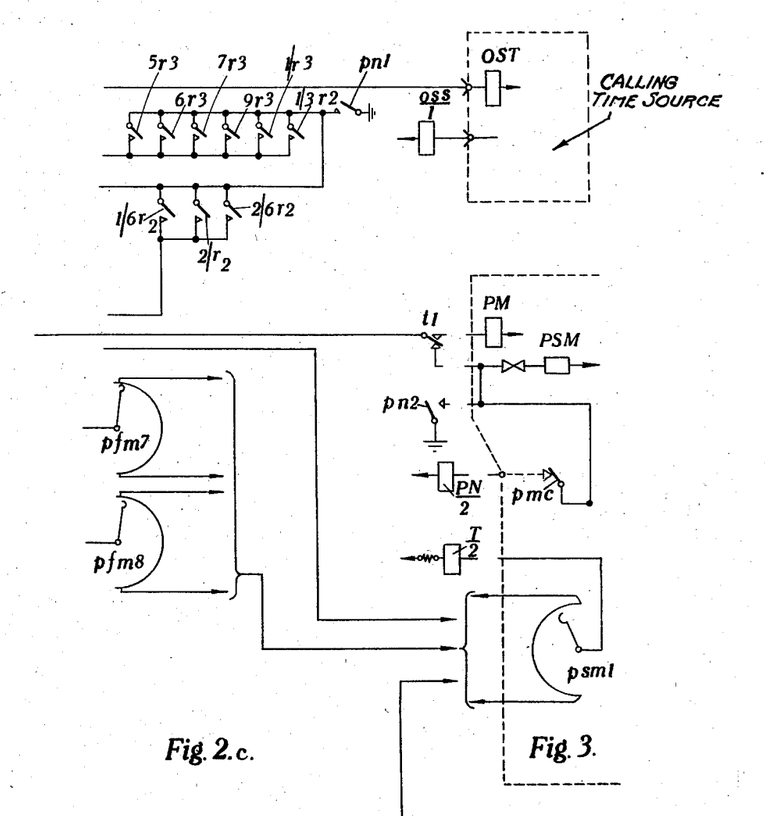
Figure 2A:
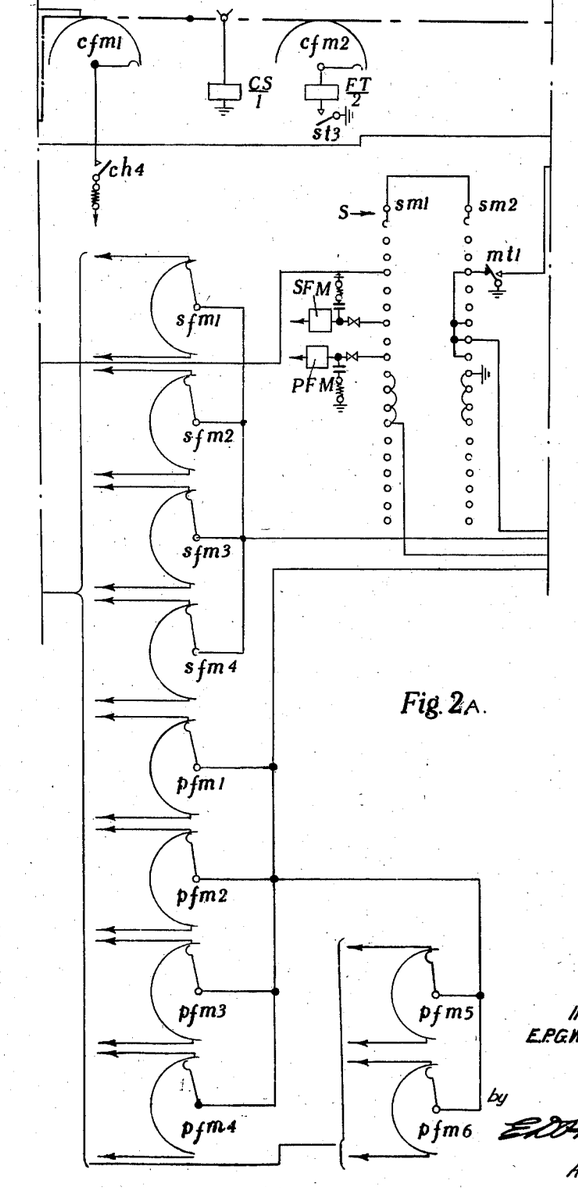
Figure 2B:
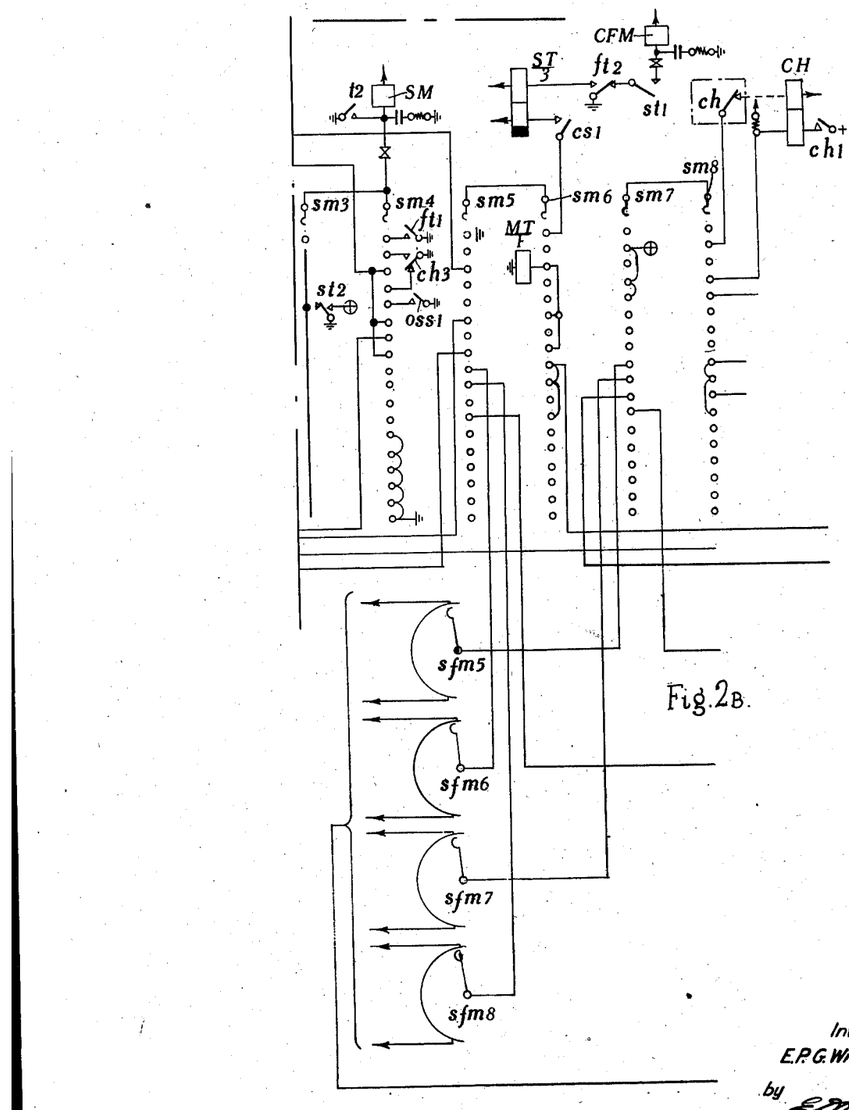

The printer comprises a type wheel (not shown) carrying at least digits 1—11 and a stroke for dividing shillings and pence. The type wheel is coaxial with and rotatable with a wiper $psm1$ cooperating with at least twelve corresponding contacts to which are connected marking wires 1—11 from contact banks $sfm5$—8 and $pfm7$ and 8, and a stroke marking wire from contact 11 of sequence switch (between the shillings positions 9, 10 and the pence position 12). There is a printer setting magnet PSM and a printing magnet PM.

When a conversation trunk circuit has a completed call for calculation, a circuit is closed over a common wire to the relay CS. Contacts $cs1$ close the obvious circuit for relay ST through wipers $sm5$ and $sm6$ of sequence switch S in position 1. ST operates and closes the obvious circuit for switch CF, which steps. Contacts $st3$ close the testing circuit through the relay FT to the wiper $cfm2$. When the calling circuit is reached, the relay FT operates, opening the stepping circuit of the switch CF and closing a locking circuit for the relay ST. Contacts $ft1$ connect earth via $sm4$ to magnet SM which advances switch S to position 2. In position 2 ground is extended through contacts $st2$, wiper $sm7$, $sm8$, through a chain of CH contacts to the winding of the relay CH. If any other calculating circuits are using the multiple between the switches TT and T, one of the CH relays will be operated and the chain will not be complete. If the multiple is free, the chain relay CH will operate and the contacts $ch3$ will advance the switch SS to position 3. The relay CH locks through its second winding and contacts $ch1$.

In position 3 a circuit is closed for the switch T through its interrupter springs $sm1$, $sm2$, $mt1$ to ground. When the switch T has reached the contact corresponding with the setting of the duration switch TT, battery via $ch4$, $cfm1$, $ttm1$, $tm1$, $sm5$, $sm6$ operates MT, which opens the circuit of the switch T and via $mt1$, $sm4$ advances the sequence switch to position 4. MT releases.

In this position ground via $sm7$, $sm8$, short circuits the locking winding of the relay CH which restores, closing at contact $ch3$ a circuit to advance the sequence switch to position 5. In this position ground is extended by means of wipers $sm7$, $sm8$ to the relay OST which may be used to give an indication from a common circuit of the time at which the call was originated. The originating time is calculated from the actual time of day recorded in the common circuit and the call duration recorded in T. Wiper $tm9$ is provided for this purpose and OT is a connecting relay for connecting up originating time receiving relays (not shown) for transfer to the printer. This information is transmitted to the receiving equipment (not shown) and recorded on the printer as described in British Patent No. 513,228.

The common circuit then operates relay OSS and earth via $oss1$ advances the sequence switch to position 6. The operation of the relay OSS is also used for a secondary setting of the switch T. The tariff to be charged is determined by another circuit associated with the conversation circuits as described in British Patent No. 513,285, and a corresponding tariff relay 5R, 6R—2/6R is operated. If the tariff is 1/- or less, charge is made for each three-minute period or fraction thereof, whereas for larger tariffs each minute after the first three is charged separately. If therefore, one of relays 5R—1/-R is operated, earth via oss2 and tm2 causes T to be advanced to one of the positions 3, 6, 9, 12, 15, etc., so that the charge is calculated on a 3-minute basis.

In position 6 of sequence switch S the switch SF is stepped through wipers sm1, sm2 and contacts mt1. The relay MT is connected through wipers sm5 and sm5 to the wipers sfm1—sfm4 in multiple and as soon as one of these wipers reaches the wire marked by switch T, as illustrated in Figs. 4A and 4B the relay MT will operate, stopping SF and advancing S to position 7. In this position the driving circuit for the switch SF is opened and the operating circuit of the relay MT is opened. When the relay MT releases, the switch S advances to position 8. In this position the switch PF is set in identical manner to the setting of the switch SF after which S is advanced to position 9.

In position 9 ground is extended through wipers sm1, sm2, contact t1, contact PM1, to the relay PN, which operates. Ground is connected via contacts pn1 through the relative tariff relay contacts, e. g. 5r3, either wipers sm8 and sm7 or wipers sm6 and sm5 to wipers sfm5 or sfm6. Wipers sfm5, sfm6 control printing of the tens shilling digit, sfm5 for half the amounts to which the contacts of wipers sfm1—sfm4 in the same position correspond, and sfm6 for the full amounts. Ground at the contact t1 is also connected to the magnet PSM of the printer switch which advances its wiper psm1 until it reaches a contact corresponding with that indicated by the wiper sfm5 or the wiper sfm6. In this position T operates, opening the circuit to the printer switch magnet PSM and closing the circuit to the printer magnet PM which carries out the printing operation. The relay PN has been locked from ground at contact pn2, but this locking circuit is opened on the operation of the magnet PM by magnet contacts pmc. The release of the relay PN opens the circuit of the relay T. Ground at contact t2 closed the obvious circuit for the switch magnet SM which advances S to position 10 on the release of the relay T.

It will be understood that the operation of the printer magnet PM can be arranged mechanically or by local electrical circuits to advance paper and carbon.

In position 10 the relay PN is again operated and the printer switch is set in accordance with the wiper sfm7 or sfm8 for the units shilling digit. The relay T and the magnet PM are again operated, advancing the switch S to position 11. In this position PN is once more operated and ground is extended from pn1 through wipers sm8 and sm7 to a particular marking wire connected to the bank psm1. PS is set to this position in which T and PM operate to cause the printing of an oblique stroke. The sequence switch advances to position 12 on release of T.

In position 12 PN energises again and the printing switch PS is set in acordance with the position of the wiper pfm7 or pfm8 to a position corresponding to the number of pence determined by the position of PF. T operates followed by PM which releases PN. Switch S steps releasing T.

It will be understood that, whereas this description refers particularly to a method of indicating the charge for a call and refers also to the use of the timing switch T for assisting in determining the time of origin, it would be possible, without departing from the spirit of the invention to print additional information which may be arranged to occur at any position of the sequence switch.

The equipment is held until the conversation circuit is released, when FT falls off, followed by ST, and switch S homes via sm3. T, SF, PF are non-homing switches.

What is claimed is:

1. Fee determining equipment for indicating the fee applicable to any given connection having a given tariff classification and duration in a telecommunication exchange system, which comprises first connecting means for making tariff connections variably in response to the tariff classification of the given connection, further connecting means for making duration connections variably in response to the duration of the given connection, a first and a second movable switch each having a plurality of banks of contacts and a wiper assembly having a corresponding plurality of wipers simultaneously movable over said banks of contacts, a plurality of fee wires each corresponding to at least one combination of tariff classification and duration, connections from each of said fee wires to a contact in one of the banks of said first movable switch and to a contact in one of the banks of said second movable switch, marking circuits for applying a marking potential through one of said tariff connections and one of said duration connections to that one of said fee wires which corresponds to the tariff classification and duration of said given connection, means for moving said first and second switches to such positions that a wiper of each switch comes in contact with that one of the contacts having said marking potential whereby the positions of said first and second switches both depend on said application of marking potential to said one of said fee wires, first indicating means for indicating at least one digit of the fee responsive to the position of said first movable switch, and second indicating means for indicating at least one other digit of the fee responsive to the position of said second movable switch.

2. Fee determining equipment according to claim 1 wherein said connections from each of said fee wires to a contact in one of the banks of said first movable switch and to a contact in one of the banks of said second movable switch comprise connections from a plurality of said fee wires to a corresponding plurality of contacts which are in different banks of said first movable switch but which all correspond to the same position of the wiper assembly thereof, and connections from said same plurality of fee wires to contacts of said second movable switch which correspond to different positions of the wiper assembly thereof, whereby the applications of marking potential to different ones of said plurality of fee wires will control the movement of said first movable switch always to the same position while controlling the movement of said second movable switch to different positions in each case.

3. Fee determining equipment according to claim 1 wherein said fee wires are less in number than the number of different combinations of tariff classification and duration and wherein said marking circuits are so multipled to said fee wires as to apply marking potential to the same fee wire through different ones of said tariff and duration connections.

4. Fee determining equipment according to claim 1 wherein said first connecting means comprises a plurality of relays each having contacts and selectively operable to close their respective contacts responsive to the tariff classification of the given connections; and wherein the further connecting means comprises a timer switch having several banks of contacts and several wipers movable thereover in dependence on the duration of said given connection; and wherein said marking circuits comprise a potential source, connections from said source through contacts of different ones of said relays to different wipers of said timer switch and connections from the contacts of said several banks to said fee wires whereby the particular relay operated and the position of said timer switch jointly determine the application of the potential of said source to a particular fee wire.

5. Fee determining equipment according to claim 1 wherein said first connecting means comprises a plurality of relays each having contacts and selectively operable to close their respective contact responsive to the tariff classification of the given connections; and wherein the further connecting means comprises a timer switch having several banks of contacts and several wipers movable thereover in dependence on the duration of said given connection; and wherein said marking circuits comprise a potential source, connections from said source through contacts of different ones of said relays to different wipers of said timer switch and connections from the contacts of said several banks to said fee wires whereby the particular relay operated and the position of said timer switch jointly determine the application of the potential of said source to a particular fee wire, and wherein said fee wires are less in number than said contacts of said several banks, a plurality of said contacts being multipled to the same fee wire.

6. Fee determining equipment according to claim 1, wherein said first connecting means for making tariff connections variably in response to the tariff classification of the call comprises means for establishing one and the same such tariff connection in response to two different tariff classifications related as simple multiples, an auxiliary circuit, and means for altering the condition of said auxiliary circuit responsive to one of said two different tariff classifications; and wherein said first and second indicating means comprise means for varying the digits indicated in dependence on the condition of said auxiliary circuit.

ESMOND PHILIP GOODWIN WRIGHT.